United States Patent Office 2,959,982
Patented Nov. 15, 1960

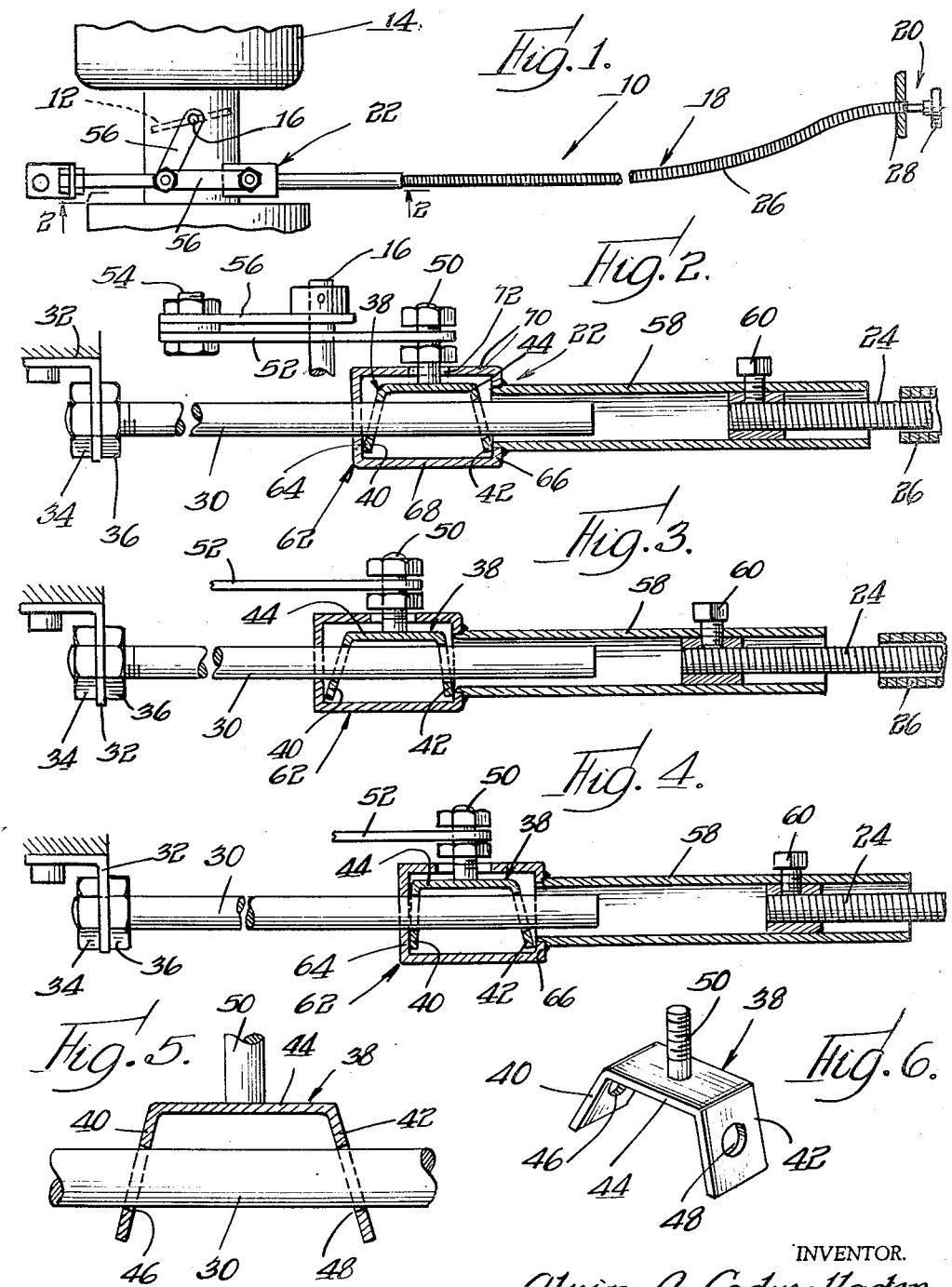

2,959,982
LINEAR IRREVERSIBLE MECHANISM

Alvin A. Cadwallader, North Wales, Pa., assignor to Teleflex Incorporated, North Wales, Pa., a corporation of Delaware Filed Dec. 19, 1957, Ser. No. 703,851

5 Claims. (Cl. 74—531)

The present invention relates to a novel control, and more particularly to a mechanism especially suitable for adjusting the position of various elements from remote location.

There are a number of installations wherein it is desirable to be able to adjust an element from a remote location and lock the element in any desired adjusted position. For example, it is desirable to be able to remotely adjust a carburetor setting on many marine or industrial engines. Similar adjustments are desirable in certain remotely controlled window installations and in connection with the steering of outboard motors or the adjustment of rudders on boats. It is therefore an important object of the present invention to provide a relatively simple and economical mechanism for use in installations of the type mentioned as well as others which will suggest themselves for the purpose of adjusting a desired element selectively in opposite directions and automatically locking the element in any desired adjusted position against inadvertent movement in opposite directions.

A more specific object of the present invention is to provide a novel mechanism whereby an element may be selectively adjusted by means of lineal forces applied in opposite directions and controlled from a remote location, which mechanism is constructed so as automatically to lock the element in any desired adjusted position against inadvertent lineal movement in either direction.

A further specific object of the present invention is to provide a novel mechanism of the above described type wherein flexible motion transmitting means is utilized for applying lineal forces from a remote location and wherein means for locking the element is disposed adjacent thereto for insuring accurate and positive locking of the element in the desired adjusted position.

Other objects and advantages of the present invention will become apparent from the following description and the accompanying drawing wherein:

Fig. 1 is a fragmentary elevational view showing a mechanism incorporating the features of the present invention installed for adjusting a carburetor;

Fig. 2 is an enlarged fragmentary sectional view taken along line 2—2 in Fig. 1;

Fig. 3 is similar to Fig. 2 but shows the manner in which the mechanism may be adjusted in one direction;

Fig. 4 is a sectional view similar to Fig. 3 but shows the manner in which the mechanism may be adjusted in the opposite direction;

Fig. 5 is a further enlarged fragmentary partial sectional view showing a portion of the mechanism in greater detail; and Fig. 6 is a perspective view showing an element of the mechanism of this invention.

Referring now more specifically to the drawings wherein like parts are designated by the same numerals throughout the various figures, a mechanism 10 is shown for adjusting a valve 12 of a carburetor or the like 14 which valve is secured to a rotatably supported shaft 16. The mechanism 10 comprises an elongated motion transmitting means 18 extending from a remote location 20 to the carburetor or the like, and means 22 adjacent the carburetor for transmitting the motion from the means 18 to the shaft 16 and for locking the shaft in any desired adjusted position. The motion transmitting means 18 comprises a flexible cable 24 slidably disposed within a guide conduit 26. Any suitable means such as handle 28 may be connected to the end of the cable 24 so that the cable may be reciprocated whenever desired.

The motion transmitting and locking means 22 comprises an elongated fixed member or rod 30 suitably secured to a bracket 32 adjacent the carburetor by a pair of nut members 34 and 36. A generally U-shaped resilient sheet material member 38 is disposed on the rod 30 and is adapted selectively to grip the rod or to be shifted along the rod in the manner described below. The member 38 is provided with a pair of leg portions 40 and 42 which are integrally connected by a bight portion 44. The leg portions 40 and 42 normally diverge outwardly from each other as shown in Figs. 2, 5 and 6. These leg portions are respectively provided with apertures 46 and 48 therethrough for receiving the elongated rod 30. The diameter of the apertures 46 and 48 is similar to the diameter of the rod 30 so that when the leg portions are disposed in positions inclined with respect to the axis of the rod 30, margins of the apertures bite into the rod. More specifically, when the leg portions are disposed in the diverging relationship shown in Figs. 2 and 5, the margins of the aperture in the leg 40 bite into the rod so as to resist movement of the member 38 along the rod toward the right as viewed in the drawings. Similarly, the margin surrounding the aperture 48 in the leg portion 42 bites into the rod 30 so as to resist movement of the member 38 toward the left as viewed in the drawings.

The member 38 is connected with the shaft 16 so that when the member 38 is adjusted in the manner described below the shaft will be adjusted. More specifically, the pin 50 is welded or otherwise secured directly to the bight portion 44 of the member 38 to which pin is pivotally connected a link 52. The link 52 is in turn pivotally connected by pin means 54 to an arm 56 which is fixed on the shaft 16. With this arrangement it is seen that when the leg portions of the member 38 are both in positions inclined with respect to the rod 30, the member 38 and thus the shaft 16 is locked against inadvertent motion in either direction.

In order to adjust the member 38 and thus the shaft 16, means is provided for transmitting the lineal motion from the cable 24 and applying it to the member 38 in a manner which releases the member and shifts it along the rod 30. More specifically, a tube 58 is connected to an end of the cable 24 by a screw 60 or any other suitable means and extends over an end portion of the rod 30. A cage structure 62 surrounds the member 38 and is welded or otherwise secured to the tube 58. This cage structure comprises opposite end portions 64 and 66 which are joined by opposite side portions 68 and 70. The side portion 70 has an elongated slot 72 therein for accommodating the pin 50. The end portions 64 and 66 have apertures therein loosely receiving the rod 30, and it is to be noted that these end portions are disposed outwardly of the leg portions 40 and 42 of the member 38 and are spaced farther apart than these leg portions so that the leg portions are normally free of the cage structure to assume the inclined positions shown in Figs. 2, 5 and 6. However, upon lineal movement of the cage structure along the rod 30 in opposite directions the end portions 64 and 66 are adapted to engage and depress the leg portions 40 and 42. Thus, when it is desired to move the member 38 toward the left as viewed in the figures, the handle 28 is pushed inwardly. This motion is transmitted by the flexible cable 24 to the tube 58 and cage structure 62 so that the cage structure is shifted toward the left as viewed in Fig. 3. Upon this shifting movement, the end portion 66 engages the leg portion 42 and depresses or deflects the leg portion until it is substantially perpendicular to the rod 30. When this occurs, the inner margins of the leg portion 42 releases the rod 30 so that the member 38 may be shifted toward the left as viewed in Fig. 3. In order to adjust the mechanism in the opposite direction, it is merely necessary to pull the handle 28 outwardly so that the cage structure 62 is shifted toward the right as viewed in the figures. When this occurs, the end portion 64 engages and depresses the leg portion 40 as shown in Fig. 4 until the leg portion releases the rod 30 at which time the member 30 will move toward the right. After the desired amount of adjustment has been accomplished in either direction, the handle 28 is released and the resiliency of the sheet material member 38 causes the leg portion which has been defected inwardly to assume its normal position inclined with respect to the axis of the rod 30 so as to whip the rod and once again lock the member 38 against inadvertent movement.

While the preferred embodiment of the present invention has been shown and described herein, it is obvious that many structural details may be changed without departing from the spirit and scope of the appended claims.

The invention is claimed as follows:

1. A control apparatus selectively adjustable in opposite directions and lockable against movement in said opposite directions, comprising a fixed member, a resilient one-piece sheet material member including first and second apertured diverging leg portions receiving and lockingly engaging said fixed member for resisting movement of said sheet material in opposite directions along said fixed member, an element secured to said sheet material member for connection with a member to be controlled, means shiftable in opposite directions along said fixed member and including first and second sections spaced farther apart from each other than said leg portions and respectively engageable with outer sides of said first and second leg portions, and means connected to said first mentioned means for selectively shifting said first mentioned means in opposite directions from a remote location, said first section deflecting said first leg portion toward said second leg portion to unlock said first leg portion from the fixed member and then shifting said sheet material member when said first mentioned means is shifted in one direction, and said second section similarly deflecting said second leg portion and then shifting the sheet material member when said first mentioned means is moved in the opposite direction.

2. A control apparatus, as defined in claim 1, wherein said sheet material member is a generally U-shaped one-piece member.

3. A control apparatus, as defined in claim 1, wherein said last mentioned means includes an elongated flexible cable extending from said remote location and connected to said first mentioned means, and guide conduit means surrounding and slidably supporting said cable.

4. A control apparatus of the type described comprising an elongated fixed rod, a one-piece resilient sheet material member including first and second apertured diverging leg portions and an intermediate portion between said leg portions, each of said leg portions receiving and having oppositely disposed inner edges lockingly engaging said rod for resisting movement of said sheet material member in opposite directions along said rod, an element secured directly to said intermediate portion of said sheet material member and adapted to be connected with a member to be controlled, means shiftable in opposite directions along said rod and including first and second sections disposed outwardly of and engageable with said first and second leg portions, and means operable from a remote location for selectively shifting said first mentioned means in opposite directions and thereby selectively adjusting said sheet material member along said rod in opposite directions.

5. A control apparatus, as defined in claim 4, wherein said first mentioned means comprises cage means including said first and second sections surrounding said sheet material member, said cage means having slot means therein through which said element connected to the sheet material member extends, and a tubular section slidably surrounding said rod and fixed to said cage means and connected to said shifting means.

References Cited in the file of this patent

UNITED STATES PATENTS

| | | |
|---|---|---|
| 1,335,429 | Danielson | Mar. 30, 1920 |
| 1,916,893 | Peterson | July 4, 1933 |
| 2,130,578 | Baker | Sept. 20, 1938 |
| 2,179,582 | Wiley | Nov. 14, 1939 |
| 2,487,606 | Smith | Nov. 8, 1949 |
| 2,567,529 | Schetzer | Sept. 11, 1951 |
| 2,731,227 | Anderson | Jan. 17, 1956 |
| 2,818,747 | Rich | Jan. 7, 1958 |

FOREIGN PATENTS

| | | |
|---|---|---|
| 24,257 of 1908 | Great Britain | Nov. 11, 1908 |
| 626,578 | Great Britain | July 18, 1949 |

OTHER REFERENCES

Product Engineering, April, 1945, p. 272.